US011269472B2

(12) United States Patent
Wang et al.

(10) Patent No.: US 11,269,472 B2
(45) Date of Patent: Mar. 8, 2022

(54) TOUCH PANEL AND TOUCH DISPLAY PANEL

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Jiangsheng Wang, Beijing (CN); Jianjun Wu, Beijing (CN); Shimin Pu, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 64 days.

(21) Appl. No.: 16/958,964

(22) PCT Filed: Jul. 31, 2019

(86) PCT No.: PCT/CN2019/098680
§ 371 (c)(1),
(2) Date: Jun. 29, 2020

(87) PCT Pub. No.: WO2021/016935
PCT Pub. Date: Feb. 4, 2021

(65) Prior Publication Data
US 2021/0405824 A1    Dec. 30, 2021

(51) Int. Cl.
*G06F 3/044* (2006.01)
*G06F 3/041* (2006.01)

(52) U.S. Cl.
CPC .......... *G06F 3/0448* (2019.05); *G06F 3/0412* (2013.01); *G06F 3/0446* (2019.05); *G06F 2203/04111* (2013.01)

(58) Field of Classification Search
CPC ................ G06F 3/0448; G06F 3/0412; G06F 3/04164; G06F 3/04186; G06F 3/0443;
(Continued)

(56) References Cited

U.S. PATENT DOCUMENTS

8,610,689 B2 * 12/2013 Chang ................... G06F 3/0446
345/173
10,162,441 B2 * 12/2018 Lin ................... G02F 1/133528
(Continued)

*Primary Examiner* — Rodney Amadiz
(74) *Attorney, Agent, or Firm* — Fay Sharpe LLP (57) ABSTRACT

The present disclosure provides a touch panel and a touch display panel. The touch panel includes: a base substrate, and a first conductive layer, an insulation layer, and a second conductive layer that are sequentially arranged along a direction away from the base substrate. The first conductive layer includes: a first touch electrode, a second touch electrode, a third touch electrode, a fourth touch electrode, a first connection electrode, and a second connection electrode. The insulation layer includes: two first insulation pads, two second insulation pads, two third insulation pads, and two fourth insulation pads. The second conductive layer includes: two first conductive bridges, two second conductive bridges, two third conductive bridges, and two fourth conductive bridges. The present disclosure is applied to touch panels.

20 Claims, 3 Drawing Sheets

(58) Field of Classification Search
CPC ......... G06F 3/0446; G06F 2203/04103; G06F 2203/04104; G06F 2203/04111
See application file for complete search history.

(56) References Cited

U.S. PATENT DOCUMENTS 10,678,389 B2 * 6/2020 Gunji .................. G06F 3/04186
2019/0064959 A1 * 2/2019 Zheng .................. G06F 3/0446

* cited by examiner

TOUCH PANEL AND TOUCH DISPLAY PANEL

CROSS-REFERENCE TO RELATED APPLICATION

The present application is a 371 application based on PCT/CN2019/098680, filed on Jul. 31, 2019, the entire contents of which are incorporated by reference herein.

TECHNICAL FIELD

The present disclosure relates to the technical field of touch, and more particularly, relates to a touch panel and a touch display panel.

BACKGROUND

With the development of touch technology, touch panels are increasingly applied to electronic products such as touch screen mobile phones or tablet computers.

SUMMARY

Embodiments of the present disclosure provide a touch panel and a touch display panel. The technical solutions are as follows:

In a first aspect, a touch panel is provided. The touch panel includes: a base substrate, and a first conductive layer, an insulation layer, and a second conductive layer that are sequentially arranged along a direction away from the base substrate; wherein the first conductive layer includes: a first touch electrode, a second touch electrode, a third touch electrode, a fourth touch electrode, a first connection electrode, and a second connection electrode; the first connection electrode is in an annular shape, and surrounds the second connection electrode, the first touch electrode, and the second touch electrode are disposed on both sides of the first connection electrode in a first direction, the third touch electrode and the fourth touch electrode are disposed on both sides of the first connection electrode in a second direction, and an included angle between the first direction and the second direction being greater than zero;

the insulation layer includes: two first insulation pads, two second insulation pads, two third insulation pads, and two fourth insulation pads; wherein one end of each of the two first insulation pads is overlapped onto the first touch electrode, and the other end of each of the two first insulation pads is overlapped onto the first connection electrode; one end of each of the two second insulation pads is overlapped onto the second touch electrode, and the other end of each of the two second insulation pads is overlapped onto the first connection electrode; one end of each of the two third insulation pads is overlapped onto the third touch electrode, and the other end of each of the two third insulation pads spans the first connection electrode and is overlapped onto the second connection electrode; one end of each of the two fourth insulation pads is overlapped onto the fourth touch electrode, and the other end of each of the two fourth insulation pads spans the first connection electrode and is overlapped onto the second connection electrode;

the second conductive layer includes: two first conductive bridges, two second conductive bridges, two third conductive bridges, and two fourth conductive bridges; wherein the two first conductive bridges one-to-one correspond to the two first insulation pads, each of the first conductive bridges is disposed on the corresponding first insulation pad, and both ends of each of the first conductive bridges are electrically connected to the first touch electrode and the first connection electrode respectively; the two second conductive bridges one-to-one correspond to the two second insulation pads, each of the second conductive bridges is disposed on the corresponding second insulation pad, and both ends of each of the second conductive bridges are electrically connected to the second touch electrode and the first connection electrode respectively; the two third conductive bridges one-to-one correspond to the two third insulation pads, each of the third conductive bridges is disposed on the corresponding third insulation pad, and both ends of each of the third conductive bridges are electrically connected to the third touch electrode and the second connection electrode respectively; and the two fourth conductive bridges one-to-one correspond to the two fourth insulation pads, each of the fourth conductive bridges is disposed on the corresponding fourth insulation pad, and both ends of each of the fourth conductive bridges are electrically connected to the fourth touch electrode and the second connection electrode respectively.

Optionally, an orthographic projection of the first connection electrode on the base substrate is in the shape of an octagonal ring; an orthographic projection of the second connection electrode on the base substrate is in the shape of an octagon, and eight inner edges in the octagonal ring are parallel to eight edges of the octagon in one-to-one correspondence.

Optionally, a ring width of the first connection electrode in the first direction is greater than a ring width of the first connection electrode in the second direction;

a maximum length of the first connection electrode in the first direction is greater than a maximum length of the first connection electrode in the second direction; and a maximum length of the second connection electrode in the first direction is less than a maximum length of the second connection electrode in the second direction.

Optionally, the octagon has a first symmetry axis and a second symmetry axis, the first symmetry axis being parallel to the first direction, and the second symmetry axis being parallel to the second direction;

the two first conductive bridges are symmetrical with respect to the first symmetry axis, the two second conductive bridges are symmetrical with respect to the first symmetry axis, and the two first conductive bridges and the two second conductive bridges are symmetrical with respect to the second symmetry axis; and the two third conductive bridges are symmetrical with respect to the second symmetry axis, the two fourth conductive bridges are symmetrical with respect to the second symmetry axis, and the two third conductive bridges and the two fourth conductive bridges are symmetrical with respect to the first symmetry axis.

Optionally, the two first conductive bridges and the two second conductive bridges are all in a striped shape and perpendicular to an outer edge of the respectively connected octagonal ring, and four outer edges that are perpendicular to the two first conductive bridges and the two second conductive bridges respectively are different;

the two third conductive bridges and the two fourth conductive bridges are both in a fold line shape, and each of the two third conductive bridges and the two fourth conductive bridges includes two conductive strips; a length of the conductive strip is e, an angle between the two conductive strips is θ, $$\frac{2d+c}{2\sin\frac{\theta}{2}} < e < 100um, \text{ and } 2\tan^{-1}\frac{2d+c}{f} < \theta < \pi;$$

wherein a distance between the first connection electrode and the second connection electrode is d, a distance between the first connection electrode and the third touch electrode is d, a distance between the first connection electrode and the fourth touch electrode is d, a minimum ring width of the first connection electrode is c, a length of the third insulation pad in a corresponding third direction is f, and a length of the fourth insulation pad in a corresponding fourth direction is f; the third direction corresponding to the third insulation pad is perpendicular to a direction of the third touch electrode overlapped by the third insulation pad toward the second connection electrode, and the fourth direction corresponding to the fourth insulation pad is perpendicular to a direction of the fourth touch electrode overlapped by the fourth insulation pad toward the second connection electrode.

Optionally, opening directions of bending angles of the two third conductive bridges are opposite, and opening directions of the bending angles of the two fourth conductive bridges are opposite.

Optionally, the two first conductive bridges, the two second conductive bridges, the two third conductive bridges, and the two fourth conductive bridges are all in a striped shape, and perpendicular to an outer edge of the respectively connected octagonal ring, and eight outer edges that are perpendicular to the two first conductive bridges, the two second conductive bridges, the two third conductive bridges, and the two fourth conductive bridges respectively are different;

lengths of the two third conductive bridges and the two fourth conductive bridges are all greater than 2d+c;

wherein a distance between the first connection electrode and the second connection electrode is d, a distance between the first connection electrode and the third touch electrode is d, a distance between the first connection electrode and the fourth touch electrodes is d, a the minimum ring width of the first connection electrode is c.

Optionally, for the two first conductive bridges, the two second conductive bridges, the two third conductive bridges and the two fourth conductive bridges, a distance between the two ends of each conductive bridge is less than 220 microns, and a width of each conductive bridge is less than 20 microns.

Optionally, the distance between the two ends of each conductive bridge is less than 110 microns.

Optionally, the width of each conductive bridge is less than 15 microns.

Optionally, the first conductive layer further includes: auxiliary electrodes disposed between each two adjacent electrodes of the first touch electrode, the second touch electrode, the third touch electrode and the fourth touch electrode; and a gap is defined between any two electrodes of the auxiliary electrodes, the first touch electrode, the second touch electrode, the third touch electrode, and the fourth touch electrode.

Optionally, two auxiliary electrodes are disposed between each two adjacent electrodes; and the auxiliary electrode is in a trapezoidal shape, and a side of the lower bottom of each of the two auxiliary electrodes faces the other auxiliary electrode.

Optionally, a material of each of the two first conductive bridges, the two second conductive bridges, the two third conductive bridges, and the two fourth conductive bridges includes metal.

In a second aspect, a touch display panel is provided. The touch display panel includes a display panel, and the touch panel as defined in the first aspect; wherein a base substrate in the touch panel is an encapsulation layer in the display panel.

In a third aspect, a touch display panel is provided. The touch display panel includes a display panel, and the touch panel as defined in the first aspect; wherein the touch panel is disposed on a light emitting side of the display panel.

DETAILED DESCRIPTION

For clearer descriptions of the principles, technical solutions and advantages in the present disclosure, the present disclosure is described in detail below in combination with the accompanying drawings.

As known by inventor, the touch panel generally includes a base substrate, and a plurality of touch electrodes and a plurality of conductive bridges on the base substrate. The plurality of touch electrodes in the touch panel are arranged in multiple rows and columns, and in either of row direction or column direction of the touch electrodes, adjacent touch electrodes are electrically connected by the conductive bridges.

Figure 1:
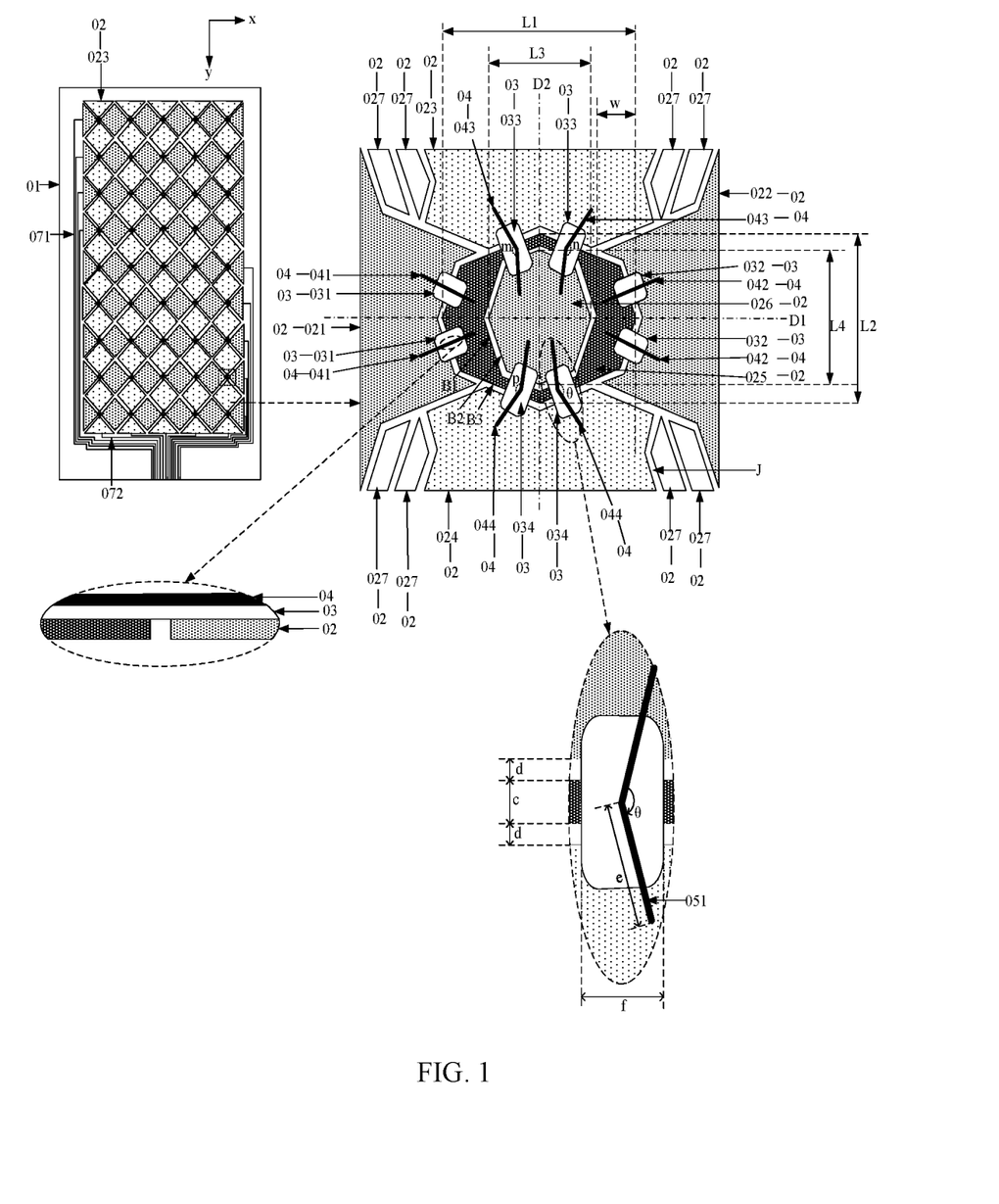
FIG. 1 is a schematic structural diagram of a touch panel according to an embodiment of the present disclosure.

FIG. 1 is a schematic structural diagram of a touch panel according to an embodiment of the present disclosure. As shown in FIG. 1, the touch panel includes: a base substrate 01, and a first conductive layer 02, an insulation layer 03, and a second conductive layer 04 that are arranged sequentially along a direction away from the base substrate 01.

The first conductive layer 02 includes: a first touch electrode 021, a second touch electrode 022, a third touch electrode 023, a fourth touch electrode 024, a first connection electrode 025, and a second connection electrode 026. The first connection electrode 025 is in an annular shape, and surrounds the second connection electrode 026. The first touch electrode 021 and the second touch electrode 022 are disposed on both sides of the first connection electrode 025 in a first direction x, and the third touch electrode 023 and the fourth touch electrode 024 are disposed on both sides of the first connection electrode 025 in a second direction y. An included angle between the first direction x and the second direction y is greater than zero. For example, the angle between the first direction x and the second direction y is 90 degrees in FIG. 1. Of course, the angle between the first direction x and the second direction y may be other degrees greater than zero, for example, 80 degrees.

The insulation layer 03 includes: two first insulation pads 031, two second insulation pads 032, two third insulation pads 033, and two fourth insulation pads 034. One end of each of the two first insulation pads 031 is overlapped onto the first touch electrode 021, and the other end of each of the two first insulation pads is overlapped onto the first connection electrode 025. One end of each of the two second insulation pads 032 is overlapped onto the second touch electrode 022, and the other end of each of two second insulation pads is overlapped onto the first connection electrode 025. One end of each of the two third insulation pads 033 is overlapped onto the third touch electrode 023, and the other end of each of the two third insulation pads spans the first connection electrode 025 and is overlapped onto the second connection electrode 026. One end of each of the two fourth insulation pads 034 is overlapped onto the fourth touch electrode 024, and the other end of each of the two fourth insulation pads spans the first connection electrode 025 and is overlapped onto the second connection electrode 026.

The second conductive layer 04 includes: two first conductive bridges 041, two second conductive bridges 042, two third conductive bridges 043, and two fourth conductive bridges 044. The two first conductive bridges 041 one-to-one correspond to the two first insulation pads 031, each of the first conductive bridges 041 is disposed on the corresponding first insulation pad 031, and both ends of each of the first conductive bridges 041 are electrically connected to the first touch electrode 021 and the first connection electrode 025 respectively. The two second conductive bridges 042 one-to-one correspond to the two second insulation pads 032, each of the second conductive bridges 042 is disposed on the corresponding second insulation pad 032, and both ends of each of the second conductive bridges 042 are electrically connected to the second touch electrode 022 and the first connection electrode 025 respectively. The two third conductive bridges 043 one-to-one correspond to the two third insulation pads 033, each of the third conductive bridges 043 is disposed on the corresponding third insulation pad 033, and both ends of each of the third conductive bridges 043 are electrically connected to the third touch electrode 023 and the second connection electrode 026 respectively. The two fourth conductive bridges 044 one-to-one correspond to the two fourth insulation pads 034, each of the fourth conductive bridges 044 is disposed on the corresponding fourth insulation pad 034, and both ends of each of the fourth conductive bridges 044 are electrically connected to the fourth touch electrode 024 and the second connection electrode 026 respectively.

As shown in FIG. 1, in the embodiment of the present disclosure, the first touch electrode 021, the first connection electrode 025, and the second touch electrode 022 are electrically connected in sequence to form an electrode extending along the first direction x. The third touch electrode 023, the second connection electrode 026, and the fourth touch electrode 024 are electrically connected in sequence to form an electrode extending along the second direction y. Besides, the electrode extending along the first direction x and the electrode extending along the second direction y intersect with each other. The touch panel may be a mutual-capacitance touch panel.

In summary, the embodiment of the present disclosure provides a brand-new touch panel. The touch panel has a different structure from a touch panel in the related art. Therefore, the structure of the touch panel is enriched.

Optionally, with continued reference to FIG. 1, an orthographic projection of the first connection electrode 025 on the base substrate 01 is in the shape of an octagonal ring. The orthographic projection of the second connection electrode 026 on the base substrate 01 is in the shape of an octagon, and eight inner edges B1 in the octagonal ring are parallel to eight edges B2 of the octagon in one-to-one correspondence. In FIG. 1, only one inner edge and one edge of the octagon are marked.

Optionally, a ring width w of the first connection electrode 025 in the first direction x is greater than a ring width c of the first connection electrode 025 in the second direction y. A maximum length L1 of the first connection electrode 025 in the first direction x is greater than a maximum length L2 of the first connection electrode 025 in the second direction y. A maximum length L3 of the second connection electrode 026 in the first direction x is less than a maximum length L4 of the second connection electrode 026 in the second direction y.

Optionally, the above octagon has a first symmetry axis D1 and a second symmetry axis D2. The first symmetry axis D1 is parallel to the first direction x, and the second symmetry axis D2 is parallel to the second direction y. The two first conductive bridges 041 are symmetrical about the first symmetry axis D1, the two second conductive bridges 042 are symmetrical with respect to the first symmetry axis D1, and the two first conductive bridges 041 and the two second conductive bridges 042 are symmetrical with respect to the second symmetry axis D2. The two third conductive bridges 043 are symmetrical with respect to the second symmetry axis D2, the two fourth conductive bridges 044 are symmetrical with respect to the second symmetry axis D2, and the two third conductive bridges 043 and the two fourth conductive bridges 044 are symmetrical with respect to the first symmetry axis D1. In this way, the conductive bridges in the touch panel are symmetrically distributed, and the distribution of the conductive bridges is relatively uniform, thereby reducing the visibility of the conductive bridges.

Optionally, the two first conductive bridges 041 and the two second conductive bridges 042 are all in a striped shape, and perpendicular to an outer edge B3 of the respectively connected octagonal ring, and four outer edges B3 that are perpendicular to the two first conductive bridges 041 and the two second conductive bridges 042 respectively are different (only one outer edge B3 is marked in FIG. 1). Optionally, a length of the first conductive bridge 041 is greater than a length of the first insulation pad 031 in the length direction of the first conductive bridge 041, and a length of the first insulation pad 031 in the length direction of the first conductive bridge 041 is greater than a width of a gap between the first conductive bridge 041 and the first connection electrode 025. Similarly, a length of the second conductive bridge 042 is greater than a length of the second insulation pad 032 in the length direction of the second conductive bridge 042, and a length of the second insulation pad 032 in the length direction of the second conductive bridge 042 is greater than a width of a gap between the second conductive bridge 042 and the first connection electrode 025.

The two third conductive bridges 043 and the two fourth conductive bridges 044 are all in a fold line shape, and each of the two third conductive bridges 043 and the two fourth conductive bridges 044 includes two conductive strips 051. A length of the conductive strip 051 is e, an angle between the two conductive strips 051 is $$\theta, \frac{2d+c}{2\sin\frac{\theta}{2}} < e < 100um, \text{ and } 2\tan^{-1}\frac{2d+c}{f} < \theta < \pi.$$

A distance between the first connection electrode 025 and the second connection electrode 026 is d, a distance between the first connection electrode 025 and the third touch electrode 023 is d, a distance between the first connection electrode 025 and the fourth touch electrode 024 is d, a minimum ring width of the first connection electrode 025 is c, a length of the third insulation pad 033 in a corresponding third direction is f, and a length of the fourth insulation pad 034 in a corresponding fourth direction is f. The third direction corresponding to the third insulation pad 033 is perpendicular to a direction of the third touch electrode 023 overlapped by the third insulation pad 033 toward the second connection electrode 026, and the fourth direction corresponding to the fourth insulation pad 034 is perpendicular to a direction of the fourth touch electrode 024 overlapped by the fourth insulation pad 34 toward the second connection electrode 026.

Optionally, with continued reference to FIG. 1, opening directions of bending angles (for example, the bending angle m and bending angle n in FIG. 1) of the two third conductive bridges 043 are opposite. Opening directions of the bending angles (for example, the bending angle p and bending angle θ in FIG. 1) of the two fourth conductive bridges 044 are opposite. In this way, the conductive bridges in the touch panel are not all regularly arranged in the same direction, thereby reducing the visibility of the conductive bridges.

It should be noted that the third conductive bridges 043 and the fourth conductive bridges 044 are all in the fold line shape in FIG. 1. Optionally, the third conductive bridges 043 and the fourth conductive bridges 044 may also be in a striped shape.

Figure 2:
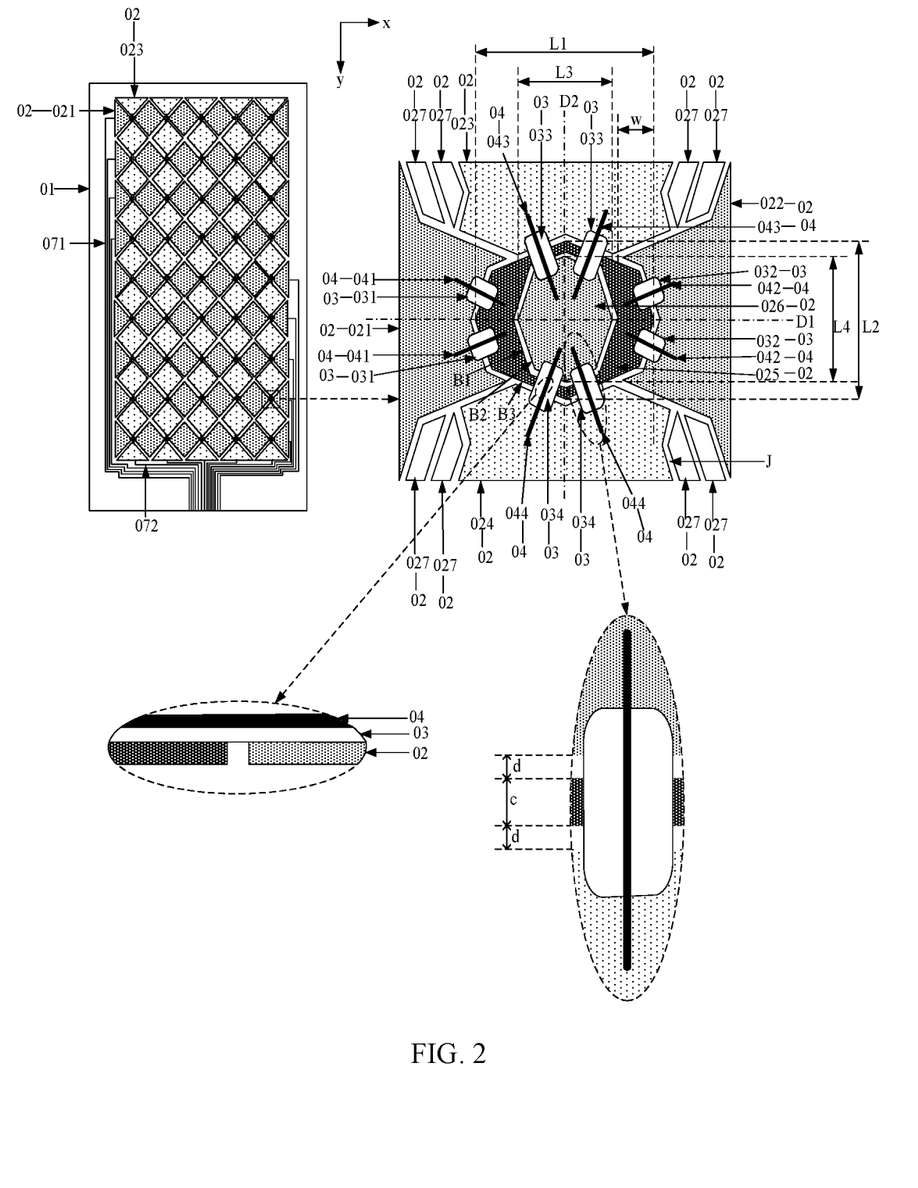
FIG. 2 is a schematic structural diagram of another touch panel according to an embodiment of the present disclosure.

Illustratively, FIG. 2 is a schematic structural diagram of another touch panel according to an embodiment of the present disclosure. As shown in FIG. 2, the two first conductive bridges 041, the two second conductive bridges 042, the two third conductive bridges 043, and the two fourth conductive bridges 044 are all in a striped shape, and perpendicular to an outer edge B3 of the respectively connected octagonal ring (the first connection electrode 25). Eight outer edges B3 that are perpendicular to the two first conductive bridges 041, the two second conductive bridges 042, the two third conductive bridges 043 and the two fourth conductive bridges 044 respectively are different. Lengths of the two third conductive bridges 043 and the two fourth conductive bridges 044 are all greater than 2d+c. The distance between the first connection electrode and the second connection electrode is d, the distance between the first connection electrode and the third touch electrode is d, the distance between the first connection electrode and the fourth touch electrodes is d, and the minimum ring width of the first connection electrode is c.

Optionally, the length of the first conductive bridge 041 is greater than the length of the first insulation pad 031 in the length direction of the first conductive bridge, and the length of the first insulation pad 031 in the length direction of the first conductive bridge is greater than the length of the gap between the first conductive bridge 041 and the first connection electrode 025. Similarly, the length of the second conductive bridge 042 is greater than the length of the second insulation pad 032 in the length direction of the second conductive bridge, and the length of the second insulation pad 032 in the length direction of the second conductive bridge is greater than the width of the gap between the second conductive bridge 042 and the first connection electrode 025.

Figure 3:
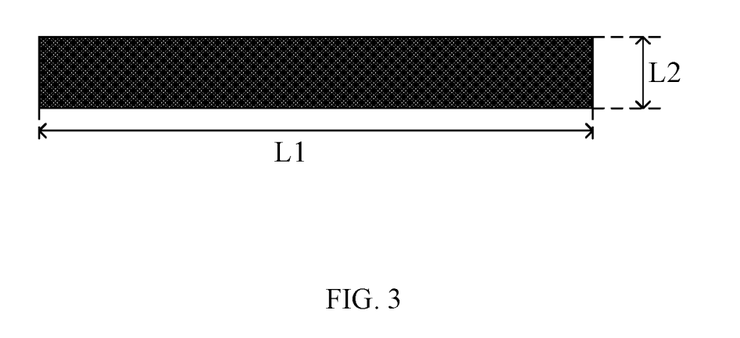
FIG. 3 is a schematic structural diagram of a conductive bridge according to an embodiment of the present disclosure.

In addition, regardless of the shapes of the two first conductive bridges, two second conductive bridges, two third conductive bridges, and two fourth conductive bridges (for example, the shape shown in FIG. 1 or FIG. 2), as shown in FIG. 3, a distance L1 between the two ends of each of these conductive bridges is less than 220 microns, and a width L2 of each conductive bridge is less than 20 microns. It should be noted that in FIG. 3, only the strip-shaped conductive bridge is used as an example.

In the touch panel according to the embodiment of the present disclosure, the distance between the two ends of the conductive bridge is less than 220 microns, and the width of the conductive bridge is less than 20 microns. However, in the related art, the distance between the two ends of the conductive bridge is greater than 220 microns, and the width of the conductive bridge is greater than 20 microns. A smaller distance between the two ends of the conductive bridge indicates a lower visibility of the conductive bridge a smaller width of the conductive bridge and a lower visibility of the conductive bridge. Therefore, in the embodiment of the present disclosure, the visibility of the conductive bridge can be reduced by reducing at least one of the distance between the two ends of at least part of the conductive bridge and the width of the conductive bridge, thereby reducing the shadow of the conductive bridge.

Optionally, the distance between the two ends of each conductive bridge is less than 110 microns, 100 microns, or the like. When the distance between the two ends of the conductive bridge is less than 110 microns or less than 100 microns, the distance between the two ends of the conductive bridge is further reduced, thereby further reducing the visibility of the conductive bridge. Optionally, the width of each conductive bridge is less than 15 microns, 10 microns, or the like. When the width L2 of the conductive bridge is less than 10 microns or 15 microns, the width of the conductive bridge is further reduced, thereby further reducing the visibility of the conductive bridge.

Optionally, a materials of each of the two first conductive bridges 041, the two second conductive bridges 042, the two third conductive bridges 043, and the two fourth conductive bridges 044 includes metal. It should be noted that the conductive bridge 03 in the embodiment of the present disclosure may be light-shielding or transparent. When the conductive bridge 03 is light-shielding, the material of the conductive bridge 03 may be metal or other light-shielding conductive materials (for example graphene). When the conductive bridge 03 is transparent, the material of the conductive bridge 03 may be indium tin oxide or other transparent conductive materials (for example, indium zinc oxide). In addition, when the material of the conductive bridge 03 is metal, since the impedance of the metal is smaller, the conductive effect of the conductive bridge 03 is better.

With continued reference to FIG. 1 or FIG. 2, regardless of the shape of the conductive bridge, the first conductive layer 02 further includes auxiliary electrodes 027 disposed between each two adjacent electrodes of the first touch electrode 021, the second touch electrode 022, the third touch electrode 023, and the four touch electrode 024. In addition, a gap J is defined between any two electrodes of the auxiliary electrodes 027, the first touch electrode 021, the second touch electrode 022, the third touch electrode 023, and the fourth touch electrode 024.

Optionally, two auxiliary electrodes 027 are disposed between each two adjacent electrodes of the first touch electrode 021, the second touch electrode 022, the third touch electrode 023, and the fourth touch electrode 024. Besides, the auxiliary electrode 027 is in a trapezoidal shape, and a side of the lower bottom of each of the two auxiliary electrodes 027 faces the other auxiliary electrode 027.

Optionally, the trapezoidal height of the auxiliary electrode 027 may be less than 30 microns. It can be seen that the trapezoidal height is smaller. Therefore, the visibility of the auxiliary electrode 027 can be reduced.

In addition, the touch panel shown in FIG. 1 and FIG. 2 may include a plurality of touch electrodes arranged in an array. These touch electrodes include the first touch electrode, the second touch electrode, the third touch electrode, and the fourth touch electrode. The touch panel may further include a plurality of first connection lines 071 corresponding to multiple rows of touch electrodes in one-to-one correspondence, and a plurality of second connection lines 072 corresponding to multiple columns of touch electrodes in one-to-one correspondence. One touch electrode in each row of touch electrodes is electrically connected to the first connection line 071 corresponding to the row of touch electrodes, and one touch electrode in each column of touch electrodes is electrically connected to the second connection line 072 corresponding to the column of touch electrodes.

By the first connection lines and the second connection lines, electrical signals can be applied to the touch electrodes connected to the connection lines, and the electrical signals on the touch electrodes can be collected to detect the touch position. Exemplarily, during detection of the touch position, a driving electrical signal may be applied to multiple columns of touch electrodes by the plurality of second connection lines in sequence. Every time the driving electrical signal is applied to one column of touch electrodes, the induced electrical signals on multiple rows of touch electrodes are collected by the plurality of first connection lines. After the driving electrical signal is applied to the $p^{th}$ column of touch electrodes, the induced electrical signals collected from the CO row of touch electrodes are not preset electrical signals. When the induced electrical signals collected from other rows of touch electrodes are all preset electrical signals, it can be determined that the intersection position of the $p^{th}$ column of touch electrodes and the $q^{th}$ row of touch electrodes is the touch position, in which p is equal or greater than l and q is equal or greater than 1.

In summary, the embodiment of the present disclosure provides a brand-new touch panel. The touch panel has a different structure from the touch panel in the related art. Therefore, the structure of the touch panel is enriched.

Moreover, in the touch panel according to the embodiment of the present disclosure, the distance between the two ends of the conductive bridge is less than 220 microns, and the width of the conductive bridge is less than 20 microns. However, in the related art, the distance between the two ends of the conductive bridge is greater than 220 microns, and the width of the conductive bridge is greater than 20 microns. A smaller distance between the two ends of the conductive bridge indicates a lower visibility of the conductive bridge, a smaller width of the conductive bridge and a lower visibility of the conductive bridge. Therefore, in the embodiment of the present disclosure, the visibility of the conductive bridge can be reduced by reducing the distance between the two ends of the conductive bridge and the width of the conductive bridge, thereby reducing the shadow of the conductive bridge.

The embodiment of the present disclosure also provides a touch display panel. The touch display panel may include a display panel, and any touch panel according to the embodiment of the present disclosure (for example, the touch panel shown in FIG. 1 or FIG. 2). Exemplarily, the touch panel may be disposed on a light emitting side of the display panel; or, the base substrate in the touch panel is an encapsulation layer in the display panel.

Further, the above touch display panel may be any product or component having a touch display function, such as a mobile phone, a tablet computer, a television, a display, a notebook computer, a digital photo frame, and a navigator.

It should be noted that in the accompanying drawings, for clarity of the illustration, the dimension of the layers and areas may be scaled up. It may be understood that when an element or layer is described as being "above" another element or layer, the described element or layer may be directly on the other element or layer, or at least one intermediate layer may be arranged between the described element or layer and the other element or layer. In addition, It may be understood that when an element or layer is described as being "below" another element or layer, the described element or layer may be directly below the other element or layer, or at least one intermediate layer may be arranged between the described element or layer and the other element or layer. In addition, it may be further understood that when a layer or element is described as being arranged "between" two layers or elements, the described layer or element may be the only layer between the two layers or elements, or at least one intermediate layer or element may be arranged between the described element or layer and the two layers or elements. In the whole specification described above, like reference numerals denote like elements.

In the present disclosure, the terms such as "first", "second", "third", and "fourth" are merely for a descriptive purpose, and cannot be understood as indicating or implying a relative importance. The term "a plurality of" means two or more in number, unless otherwise defined.

The foregoing descriptions are merely optional embodiments of the present disclosure, and are not intended to limit the present disclosure. Within the spirit and principles of the disclosure, any modifications, equivalent substitutions, improvements, or the like are within the protection scope of the present disclosure.

What is claimed is:

1. A touch panel, comprising: a base substrate, a first conductive layer, an insulation layer, and a second conductive layer that are sequentially arranged along a direction away from the base substrate; wherein
    the first conductive layer comprises: a first touch electrode, a second touch electrode, a third touch electrode, a fourth touch electrode, a first connection electrode, and a second connection electrode; wherein the first connection electrode is in an annular shape and surrounds the second connection electrode, the first touch electrode and the second touch electrode are disposed on both sides of the first connection electrode in a first direction, and the third touch electrode and the fourth touch electrode are disposed on both sides of the first connection electrode in a second direction, an included angle between the first direction and the second direction being greater than zero;
    the insulation layer comprises: two first insulation pads, two second insulation pads, two third insulation pads, and two fourth insulation pads; wherein one end of each of the two first insulation pads is overlapped onto the first touch electrode, and the other end of each of the two first insulation pads is overlapped onto the first connection electrode; one end of each of the two second insulation pads is overlapped onto the second touch electrode, and the other end of each of the two second insulation pads is overlapped onto the first connection electrode; one end of each of the two third insulation pads is overlapped onto the third touch electrode, and the other end of each of the two third insulation pads spans the first connection electrode and is overlapped onto the second connection electrode; one end of each of the two fourth insulation pads is overlapped onto the fourth touch electrode, and the other end of each of the two fourth insulation pads spans the first connection electrode and is overlapped onto the second connection electrode;

the second conductive layer comprises: two first conductive bridges, two second conductive bridges, two third conductive bridges, and two fourth conductive bridges; wherein the two first conductive bridges one-to-one correspond to the two first insulation pads, each of the first conductive bridges is disposed on the corresponding first insulation pad, and both ends of each of the first conductive bridges are electrically connected to the first touch electrode and the first connection electrode respectively; the two second conductive bridges one-to-one correspond to the two second insulation pads, each of the second conductive bridges is disposed on the corresponding second insulation pad, and both ends of each of the second conductive bridges are electrically connected to the second touch electrode and the first connection electrode respectively; the two third conductive bridges one-to-one correspond to the two third insulation pads, each of the third conductive bridges is disposed on the corresponding third insulation pad, and both ends of each of the third conductive bridges are electrically connected to the third touch electrode and the second connection electrode respectively; and the two fourth conductive bridges one-to-one correspond to the two fourth insulation pads, each of the fourth conductive bridges is disposed on the corresponding fourth insulation pad, and both ends of each of the fourth conductive bridges are electrically connected to the fourth touch electrode and the second connection electrode respectively.

2. The touch panel according to claim 1, wherein an orthographic projection of the first connection electrode on the base substrate is in the shape of an octagonal ring; an orthographic projection of the second connection electrode on the base substrate is in the shape of an octagon, and eight inner edges in the octagonal ring are parallel to eight edges of the octagon in one-to-one correspondence.

3. The touch panel according to claim 2, wherein
a ring width of the first connection electrode in the first direction is greater than a ring width of the first connection electrode in the second direction;
a maximum length of the first connection electrode in the first direction is greater than a maximum length of the first connection electrode in the second direction; and
a maximum length of the second connection electrode in the first direction is less than a maximum length of the second connection electrode in the second direction.

4. The touch panel according to claim 3, wherein the octagon has a first symmetry axis and a second symmetry axis, the first symmetry axis being parallel to the first direction, and the second symmetry axis being parallel to the second direction; wherein
the two first conductive bridges are symmetrical with respect to the first symmetry axis, the two second conductive bridges are symmetrical with respect to the first symmetry axis, and the two first conductive bridges and the two second conductive bridges are symmetrical with respect to the second symmetry axis; and the two third conductive bridges are symmetrical with respect to the second symmetry axis, the two fourth conductive bridges are symmetrical with respect to the second symmetry axis, and the two third conductive bridges and the two fourth conductive bridges are symmetrical with respect to the first symmetry axis.

5. The touch panel according to claim 3, wherein the two first conductive bridges and the two second conductive bridges are all in a striped shape and perpendicular to an outer edge of the respectively connected octagonal ring, and four outer edges that are perpendicular to the two first conductive bridges and the two second conductive bridges respectively are different;

the two third conductive bridges and the two fourth conductive bridges are all in a fold line shape, and each of the two third conductive bridges and the two fourth conductive bridges comprises two conductive strips; a length of the conductive strip is e, an included angle between the two conductive strips is θ, $$\frac{2d+c}{2\sin\frac{\theta}{2}} < e < 100um, \text{ and } 2\tan^{-1}\frac{2d+c}{f} < \theta < \pi;$$

wherein a distance between the first connection electrode and the second connection electrode is d, a distance between the first connection electrode and the third touch electrode is d, a distance between the first connection electrode and the fourth touch electrode is d, a minimum ring width of the first connection electrode is c, a length of the third insulation pad in a corresponding third direction is f, and a length of the fourth insulation pad in a corresponding fourth direction is f; the third direction corresponding to the third insulation pad is perpendicular to a direction of the third touch electrode overlapped by the third insulation pad toward the second connection electrode, and the fourth direction corresponding to the fourth insulation pad is perpendicular to a direction of the fourth touch electrode overlapped by the fourth insulation pad toward the second connection electrode.

6. The touch panel according to claim 3, wherein the two first conductive bridges, the two second conductive bridges, the two third conductive bridges, and the two fourth conductive bridges are all in a striped shape, and perpendicular to an outer edge of the respectively connected octagonal ring, and eight outer edges that are perpendicular to the two first conductive bridges, the two second conductive bridges, the two third conductive bridges, and the two fourth conductive bridges respectively are different;

lengths of the two third conductive bridges and the two fourth conductive bridges are all greater than 2d+c;
wherein a distance between the first connection electrode and the second connection electrode is d, a distance between the first connection electrode and the third touch electrode is d, a distance between the first connection electrode and the fourth touch electrodes is d, and a minimum ring width of the first connection electrode is c.

7. The touch panel according to claim 2, wherein the octagon has a first symmetry axis and a second symmetry axis, the first symmetry axis being parallel to the first direction, and the second symmetry axis being parallel to the second direction; wherein the two first conductive bridges are symmetrical with respect to the first symmetry axis, the two second conductive bridges are symmetrical with respect to the first symmetry axis, and the two first conductive bridges and the two second conductive bridges are symmetrical with respect to the second symmetry axis; and the two third conductive bridges are symmetrical with respect to the second symmetry axis, the two fourth conductive bridges are symmetrical with respect to the second symmetry axis, and the two third conductive bridges and the two fourth conductive bridges are symmetrical with respect to the first symmetry axis.

8. The touch panel according to claim 4, wherein the two first conductive bridges and the two second conductive bridges are all in a striped shape and perpendicular to an outer edge of the respectively connected octagonal ring, and four outer edges that are perpendicular to the two first conductive bridges and the two second conductive bridges respectively are different;

the two third conductive bridges and the two fourth conductive bridges are all in a fold line shape, and each of the two third conductive bridges and the two fourth conductive bridges comprises two conductive strips; a length of the conductive strip is e, an included angle between the two conductive strips is θ, $$\frac{2d+c}{2\sin\frac{\theta}{2}} < e < 100um, \text{ and } 2\tan^{-1}\frac{2d+c}{f} < \theta < \pi;$$

wherein a distance between the first connection electrode and the second connection electrode is d, a distance between the first connection electrode and the third touch electrode is d, a distance between the first connection electrode and the fourth touch electrode is d, a minimum ring width of the first connection electrode is c, a length of the third insulation pad in a corresponding third direction is f, and a length of the fourth insulation pad in a corresponding fourth direction is f; the third direction corresponding to the third insulation pad is perpendicular to a direction of the third touch electrode overlapped by the third insulation pad toward the second connection electrode, and the fourth direction corresponding to the fourth insulation pad is perpendicular to a direction of the fourth touch electrode overlapped by the fourth insulation pad toward the second connection electrode.

9. The touch panel according to claim 2, wherein the two first conductive bridges and the two second conductive bridges are all in a striped shape and perpendicular to an outer edge of the respectively connected octagonal ring, and four outer edges that are perpendicular to the two first conductive bridges and the two second conductive bridges respectively are different;

the two third conductive bridges and the two fourth conductive bridges are all in a fold line shape, and each of the two third conductive bridges and the two fourth conductive bridges comprises two conductive strips; a length of the conductive strip is e, an included angle between the two conductive strips is θ, $$\frac{2d+c}{2\sin\frac{\theta}{2}} < e < 100um, \text{ and } 2\tan^{-1}\frac{2d+c}{f} < \theta < \pi;$$

wherein a distance between the first connection electrode and the second connection electrode is d, a distance between the first connection electrode and the third touch electrode is d, a distance between the first connection electrode and the fourth touch electrode is d, a minimum ring width of the first connection electrode is c, a length of the third insulation pad in a corresponding third direction is f, and a length of the fourth insulation pad in a corresponding fourth direction is f; the third direction corresponding to the third insulation pad is perpendicular to a direction of the third touch electrode overlapped by the third insulation pad toward the second connection electrode, and the fourth direction corresponding to the fourth insulation pad is perpendicular to a direction of the fourth touch electrode overlapped by the fourth insulation pad toward the second connection electrode.

10. The touch panel according to claim 9, wherein opening directions of bending angles of the two third conductive bridges are opposite, and opening directions of the bending angles of the two fourth conductive bridges are opposite.

11. The touch panel according to claim 2, wherein the two first conductive bridges, the two second conductive bridges, the two third conductive bridges, and the two fourth conductive bridges are all in a striped shape, and perpendicular to an outer edge of the respectively connected octagonal ring, and eight outer edges that are perpendicular to the two first conductive bridges, the two second conductive bridges, the two third conductive bridges, and the two fourth conductive bridges respectively are different;

lengths of the two third conductive bridges and the two fourth conductive bridges are all greater than 2d+c;

wherein a distance between the first connection electrode and the second connection electrode is d, a distance between the first connection electrode and the third touch electrode is d, a distance between the first connection electrode and the fourth touch electrodes is d, and a minimum ring width of the first connection electrode is c.

12. The touch panel according to claim 2, wherein the two first conductive bridges, the two second conductive bridges, the two third conductive bridges, and the two fourth conductive bridges are all in a striped shape, and perpendicular to an outer edge of the respectively connected octagonal ring, and eight outer edges that are perpendicular to the two first conductive bridges, the two second conductive bridges, the two third conductive bridges, and the two fourth conductive bridges respectively are different;

lengths of the two third conductive bridges and the two fourth conductive bridges are all greater than 2d+c;

wherein a distance between the first connection electrode and the second connection electrode is d, a distance between the first connection electrode and the third touch electrode is d, a distance between the first connection electrode and the fourth touch electrodes is d, and a minimum ring width of the first connection electrode is c.

13. The touch panel according to claim 1, wherein for the two first conductive bridges, the two second conductive bridges, the two third conductive bridges and the two fourth conductive bridges, a distance between two ends of each conductive bridge is less than 220 microns, and a width of each conductive bridge is less than 20 microns.

14. The touch panel according to claim 13, wherein the distance between the two ends of each conductive bridge is less than 110 microns.

15. The touch panel according to claim 13, wherein the width of each conductive bridge is less than 15 microns.

16. The touch panel according to claim 1, wherein the first conductive layer further comprises: auxiliary electrodes disposed between each two adjacent electrodes of the first touch electrode, the second touch electrode, the third touch electrode, and the fourth touch electrode; and a gap is defined between any two electrodes of the auxiliary electrodes, the first touch electrode, the second touch electrode, the third touch electrode, and the fourth touch electrode.

17. The touch panel according to claim 16, wherein two auxiliary electrodes are disposed between each two adjacent electrodes; and the auxiliary electrode is in a trapezoidal shape, and a side of the lower bottom of each of the two auxiliary electrodes faces the other auxiliary electrode.

18. The touch panel according to claim 1, wherein a material of each of the two first conductive bridges, the two second conductive bridges, the two third conductive bridges, and the two fourth conductive bridges comprises a metal.

19. A touch display panel, comprising a display panel, and the touch panel as defined in claim 1; wherein a base substrate in the touch panel is an encapsulation layer in the display panel.

20. A touch display panel, comprising a display panel, and the touch panel as defined in claim 1; wherein the touch panel is disposed on a light emitting side of the display panel.

* * * * *